US012420889B1

(12) United States Patent
Su

(10) Patent No.: US 12,420,889 B1
(45) Date of Patent: Sep. 23, 2025

(54) SPROCKET ASSEMBLY

(71) Applicant: SRAM, LLC, Chicago, IL (US)

(72) Inventor: Chi-Hui Su, Taichung (TW)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 18/613,857

(22) Filed: Mar. 22, 2024

(51) Int. Cl.
*B62M 9/10* (2006.01)
*B23K 20/12* (2006.01)
*B23K 101/00* (2006.01)

(52) U.S. Cl.
CPC ............. *B62M 9/10* (2013.01); *B23K 20/12* (2013.01); *B23K 2101/008* (2018.08)

(58) Field of Classification Search
CPC ............ B62M 9/10; B62M 9/12; F16H 55/30
USPC ......................................................... 474/160
See application file for complete search history.

(56) References Cited

U.S. PATENT DOCUMENTS

| | | | | |
|---|---|---|---|---|
| 5,194,051 A * | 3/1993 | Nagano | ................... | B62M 9/10 474/160 |
| 5,213,550 A * | 5/1993 | Wu | ......................... | F16H 55/12 474/160 |
| 6,428,437 B1 * | 8/2002 | Schlanger | ................ | B62M 9/10 474/160 |
| 8,197,371 B2 * | 6/2012 | D'Aluisio | ................ | B62M 9/12 301/110.5 |
| 9,511,819 B1 * | 12/2016 | Watarai | ..................... | B62M 9/10 |
| 10,093,388 B2 * | 10/2018 | Kamada | .................. | B62M 9/10 |
| 10,151,378 B2 * | 12/2018 | Reineke | .................. | F16H 55/30 |
| 10,377,174 B2 * | 8/2019 | Fujita | ................... | B60B 27/0021 |
| 10,442,496 B2 * | 10/2019 | Iwai | ...................... | F16H 55/30 |
| 10,618,597 B2 * | 4/2020 | Fujita | ....................... | B62M 9/10 |
| 10,730,585 B2 * | 8/2020 | Braedt | ..................... | B62M 9/10 |
| 10,752,320 B2 * | 8/2020 | Oka | ......... | B60B 27/047 |
| 10,864,964 B2 * | 12/2020 | Iwai | ........................ | B62M 9/12 |
| 10,946,931 B2 * | 3/2021 | Fujita | .................. | B60B 27/0052 |
| 10,946,933 B2 * | 3/2021 | Braedt | ..................... | B62M 9/10 |
| 11,052,969 B2 * | 7/2021 | Civiero | .................... | B62M 9/10 |
| 11,072,203 B2 * | 7/2021 | Bots | ......................... | F16D 1/10 |
| 11,192,605 B2 * | 12/2021 | Braedt | .................... | F16D 1/108 |
| 11,220,309 B2 * | 1/2022 | Fujita | ..................... | B62M 9/121 |
| 11,279,442 B2 * | 3/2022 | Oka | ......................... | B60B 27/047 |
| 11,305,837 B2 * | 4/2022 | Komatsu | ................. | B62M 9/12 |
| 11,332,213 B2 * | 5/2022 | Fujita | ..................... | F16H 55/30 |
| 11,351,815 B2 * | 6/2022 | Thrash | .................. | B60B 27/023 |
| 11,485,449 B2 * | 11/2022 | Thrash | .................... | B62M 9/10 |
| 11,591,043 B2 * | 2/2023 | Civiero | ................... | F16H 55/30 |
| 11,655,003 B2 * | 5/2023 | Emura | .................... | F16H 55/06 474/160 |
| 11,772,741 B2 * | 10/2023 | Fujita | ...................... | B62M 9/10 474/160 |
| 11,840,314 B2 * | 12/2023 | Heyna | ..................... | B62M 9/125 |
| 11,845,513 B2 * | 12/2023 | Fujita | ....................... | B62M 9/10 |

(Continued)

FOREIGN PATENT DOCUMENTS

EP 1972541 6/2010

*Primary Examiner* — Henry Y Liu

(57) ABSTRACT

A sprocket assembly includes a carrier and a plurality of sprockets. The carrier has a central axis. Each of the sprockets has a different number of teeth and is formed with a central through hole. The carrier extends into the central through hole of each of the sprockets such that the sprockets are disposed on an outer periphery of the carrier and are disposed along the central axis. At least one of the sprockets is coupled to the carrier by a weld that is formed via a solid-state welding technique.

24 Claims, 13 Drawing Sheets

(56) References Cited

U.S. PATENT DOCUMENTS

| | | | |
|---|---|---|---|
| 11,932,351 B2* | 3/2024 | Thrash | B62M 9/10 |
| 12,037,078 B2* | 7/2024 | Braedt | B62K 25/02 |
| 2009/0098966 A1* | 4/2009 | Kamada | B62M 9/10 |
| | | | 474/160 |
| 2012/0220402 A1* | 8/2012 | D'Aluisio | B62M 9/12 |
| | | | 474/160 |
| 2016/0258523 A1* | 9/2016 | Reineke | F16H 55/30 |
| 2016/0347410 A1* | 12/2016 | Watarai | B62M 9/10 |
| 2017/0057597 A1* | 3/2017 | Tokuyama | B62M 9/10 |
| 2017/0369124 A1* | 12/2017 | Kamada | F16H 55/30 |
| 2018/0229801 A1* | 8/2018 | Nishimoto | F16H 55/30 |
| 2018/0237103 A1* | 8/2018 | Fujita | F16H 55/30 |
| 2018/0281898 A1* | 10/2018 | Iwai | B62M 9/12 |
| 2018/0283520 A1* | 10/2018 | Iwai | F16H 55/12 |
| 2018/0297664 A1* | 10/2018 | Fukumori | B62M 9/10 |
| 2018/0346064 A1* | 12/2018 | Fujita | B62M 9/10 |
| 2018/0346067 A1* | 12/2018 | Fujita | B60B 27/023 |
| 2019/0047324 A1* | 2/2019 | Fujita | B62M 9/10 |
| 2019/0061873 A1* | 2/2019 | Fujita | F16H 55/30 |
| 2019/0084645 A1* | 3/2019 | Emura | F16H 57/0025 |
| 2019/0084646 A1* | 3/2019 | Emura | F16H 55/08 |
| 2019/0092427 A1* | 3/2019 | Oka | B62M 9/12 |
| 2019/0112004 A1* | 4/2019 | Civiero | B62M 9/04 |
| 2019/0113123 A1* | 4/2019 | Civiero | B60B 27/023 |
| 2019/0185108 A1* | 6/2019 | Bush | F16H 55/12 |
| 2019/0225301 A1* | 7/2019 | Emura | F16H 55/30 |
| 2020/0070934 A1* | 3/2020 | Iwai | B62M 9/10 |
| 2022/0063761 A1* | 3/2022 | Heyna | B62M 9/125 |
| 2022/0063762 A1* | 3/2022 | Braedt | B62M 9/04 |
| 2022/0169336 A1* | 6/2022 | Geist | B62M 9/10 |
| 2024/0158044 A1* | 5/2024 | Heyna | B62M 9/12 |
| 2024/0227981 A1* | 7/2024 | Thomas | B62L 1/005 |
| 2024/0326952 A1* | 10/2024 | Braedt | B62M 9/04 |

* cited by examiner

SPROCKET ASSEMBLY

FIELD

The disclosure relates to a sprocket assembly, and more particularly to a sprocket assembly that is formed via a solid-state welding technique.

BACKGROUND

A multi-sprocket cogset or cassette is for use in a multi-speed bicycle, and has a plurality of interconnected sprockets. In one example, the sprockets are individually formed, and are interconnected by a plurality of pins. However, any two adjacent ones of the sprockets need to be formed with pin holes in a manner that the pin holes in one of the two adjacent ones of the sprockets are respectively aligned with the pin holes in another one of the two adjacent ones of the sprockets, such that the pins are able to be installed into the pin holes in the two adjacent ones of the sprockets. Such processes are laborious and time-consuming. In another example, the sprockets are integrally formed from a truncated cone via 5-axis machining. Such process is costly and time-consuming.

SUMMARY

Therefore, an object of the disclosure is to provide a sprocket assembly that can alleviate at least one of the drawbacks of the prior arts.

According to one aspect of the disclosure, the sprocket assembly includes a carrier and a plurality of sprockets. The carrier has a central axis. Each of the sprockets has a different number of teeth and is formed with a central through hole. The carrier extends into the central through hole of each of the sprockets such that the sprockets are disposed on an outer periphery of the carrier and are disposed along the central axis. At least one of the sprockets is coupled to the carrier by a weld that is formed via a solid-state welding technique.

According to another aspect of the disclosure, the sprocket assembly includes a carrier and at least one sprocket. The at least one sprocket is formed with a central through hole. The carrier extends into the central through hole of the at least one sprocket such that the at least one sprocket is disposed on an outer periphery of the carrier. The at least one sprocket is coupled to the carrier by a weld that is formed via a solid-state welding technique.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
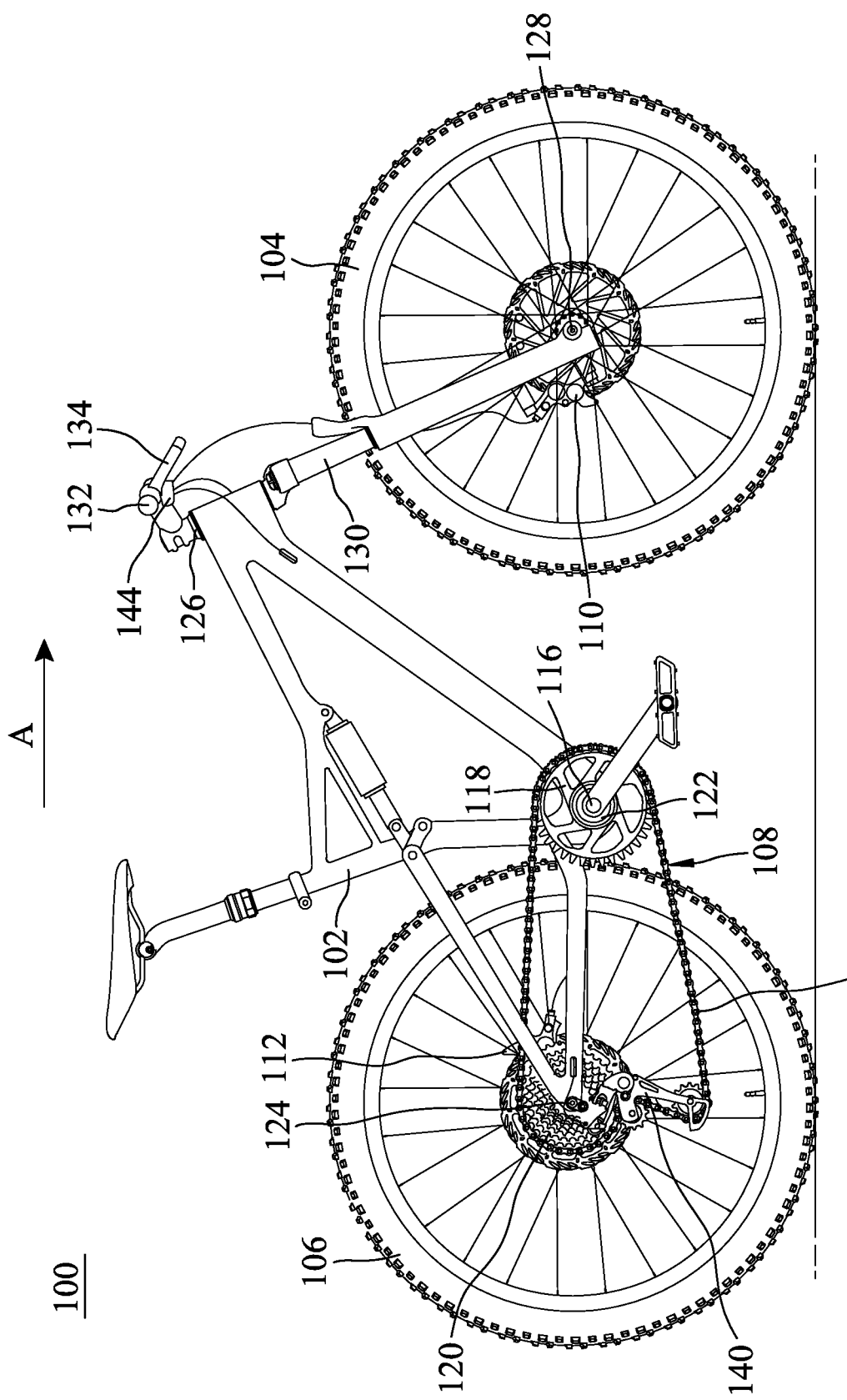
FIG. 1 is a side view of an example of a bicycle.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Examples of a sprocket assembly disclosed herein are used in a transmission train of a bicycle. An example sprocket assembly disclosed herein includes a carrier, and at least one sprocket that is coupled to the carrier by a weld formed via a solid-state selding technique. For example, the carrier may have a carrier working surface, and the at least one sprocket may have a sprocket working surface that is flush with the carrier working surface and that cooperates with the carrier working surface to form a borderline therebetween. A solid-state welding tool may be moved along the borderline to form the weld that coupled the carrier and the at least one sprocket together. In one example, the carrier may have a carrier positioning structure, and the at least one sprocket may have a sprocket positioning structure that engages the carrier positioning structure such that the sprocket working surface and the carrier working surface are flush with each other after the at least one sprocket is mounted onto the carrier. In one example, the weld extends over the whole borderline between the sprocket working surface and the carrier working surface. In one embodiment, the carrier and the at least one sprocket are constructed of a same material. In one embodiment, the carrier and the at least one sprocket are constructed of different material.

One example type of solid-state welding that can be used to weld the carrier and the at least one sprocket is friction stir welding. Friction stir welding is a process that uses a non-consumable tool to join two metal pieces without melting the material of the metal pieces. The tool has a probe or bit extending from a shoulder thereof. The tool is rotated up to a relatively high speed and pushed toward a junction between the metal pieces until the probe pierces into the metal pieces and the shoulder touches the metal pieces. Portions of the two metal pieces adjacent to the probe are softened without melting by heat generated by friction between the rotating tool and the two metal pieces. The tool is moved along a borderline formed at the junction between the two metal pieces, so as to mechanically intermix the two metal pieces at the junction therebetween. The shoulder of the tool applies mechanical pressure onto the junction between the two metal pieces so as to forge the hot and softened metal. Upon cooling, a solid phase weld or bond is created between the metal pieces. Friction stir welding merely mixes and forges the material of the two metal pieces that is present at the junction. Therefore, the weld is composed only of material from the two metal pieces, and forms a strong bond that mechanically couples the two metal pieces.

FIG. 1 illustrates an example of a bicycle 100 that includes a main frame 102, a front wheel 104, a rear wheel 106, and a drivetrain 108. The front wheel 104 and the rear wheel 106 are rotatably connected to the main frame 102. In the illustrated example, the bicycle 100 further includes a braking system that includes a front brake 110 and a rear brake 112 for respectively braking the front wheel 104 and the rear wheel 106. In the illustrated example, the drivetrain 108 includes a chain 114, a spindle 116 rotatably mounted to the main frame 102, a front sprocket assembly 118 coaxially mounted to the spindle 7, and a rear sprocket assembly 120 coaxially mounted to the rear wheel 106. Each of the front sprocket assembly 118 and the rear sprocket assembly 120 includes at least one sprocket. The direction of arrow (A) in FIG. 1 indicates a forward direction of movement for the bicycle 100.

In the illustrated example, the bicycle 100 includes a bottom bracket 122, a rear wheel hub 124, a headset 126, and a front wheel hub 128. The bottom bracket 122 is mounted to a bottom portion of the main frame 102, and supports the spindle 116 relative to the main frame 102. The rear wheel hub 124 is mounted to a rear portion of the main frame 102, and supports the rear wheel 106 and the rear sprocket assembly 120 relative to the main frame 102. The headset 126 is mounted to a front portion of the main frame 102. In the illustrated example, the front wheel 104 is coupled to the front portion of the main frame 102 via a front fork 130 that is rotatably mounted to the headset 126. The front wheel hub 128 is mounted to a bottom portion of the front fork 130, and supports the front wheel 104 relative to the front fork 130. The bicycle 100 may further have a handlebar 132 that is co-rotatably connected to the front fork 130. Each of the bottom bracket 122, the rear wheel hub 124, the headset 126, and the front wheel hub 128 may include components that are rotatable relative to each other.

In the illustrated example of FIG. 1, the bicycle 100 may have a single-speed drivetrain or a multi-speed drivetrain which has a shifting system. For example, the bicycle 100 may have a multiple-geared drivetrain 108 that may have one or both of a front gear changer (described further below as a front shifting system) and a rear gear changer mounted to the main frame 102. The gear changers may be electromechanical derailleurs, for example, including a rear derailleur 140 and a front shifting system. The gear changers can be operable using a one or more gear shifters 144, which may be mounted to the handlebar 132. The gear shifters 144 may operate the gear changes through wireless communication, or via a physical connection using a mechanical shift cable or hydraulic line. The bicycle 100 as described above, other than the chain rings and the front shifting system, is known in the art and is shown in FIG. 1 to be a full-suspension mountain bike with a flat handlebar. Those having ordinary skill in the art should recognize that the type and style of bicycle may vary from the disclosed example. For example, a road bicycle with drop-style handlebars, along with a drivetrain having road type gearing with a road gear range may be used instead of a mountain bike or other bicycle gear range, or an e-bike with an integrated electric motor used to assist propulsion.

In this example, the bicycle 100 includes brake system. The brake system includes at least one brake lever 134 that is movably connected to the handlebar 132. The brake lever 134 is configured to operate components of the braking system of the bicycle 100. In one example, the brake system can include one or both of a hydraulic or cable actuated front brake mechanism coupled to the front wheel 104 via a hydraulic line or mechanical cable and a hydraulic or cable actuated rear brake mechanism (not shown) coupled to the rear wheel 106 through a hydraulic line or mechanical cable. As noted above, the brake system can be a hydraulic actuated system or a mechanical actuated system and both are known in the art.

Figure 2:
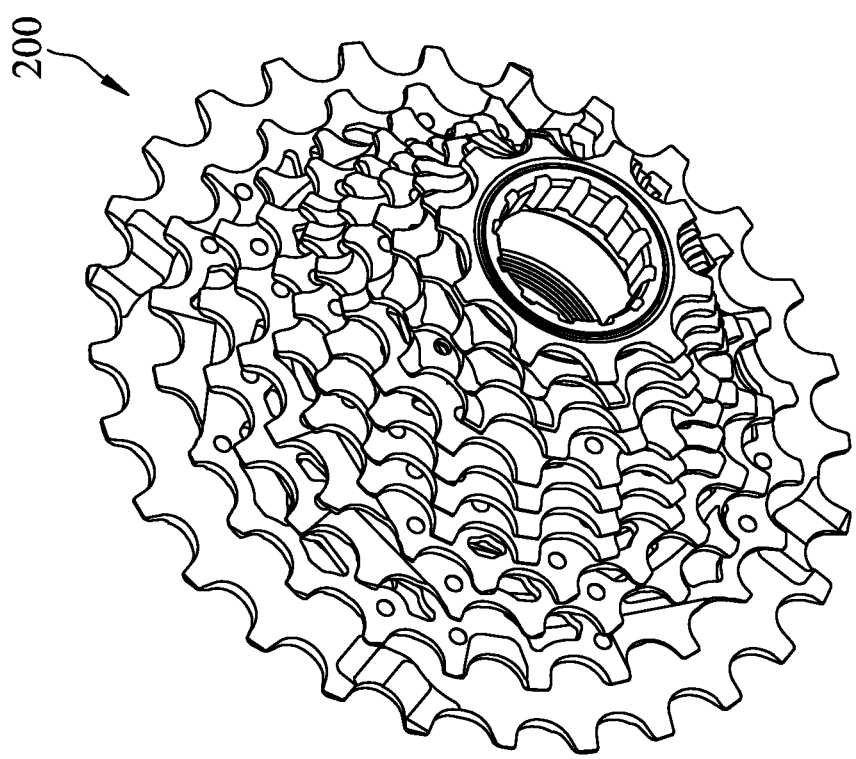
FIG. 2 is a perspective view of an example multi-sprocket cogset.
Figure 3:
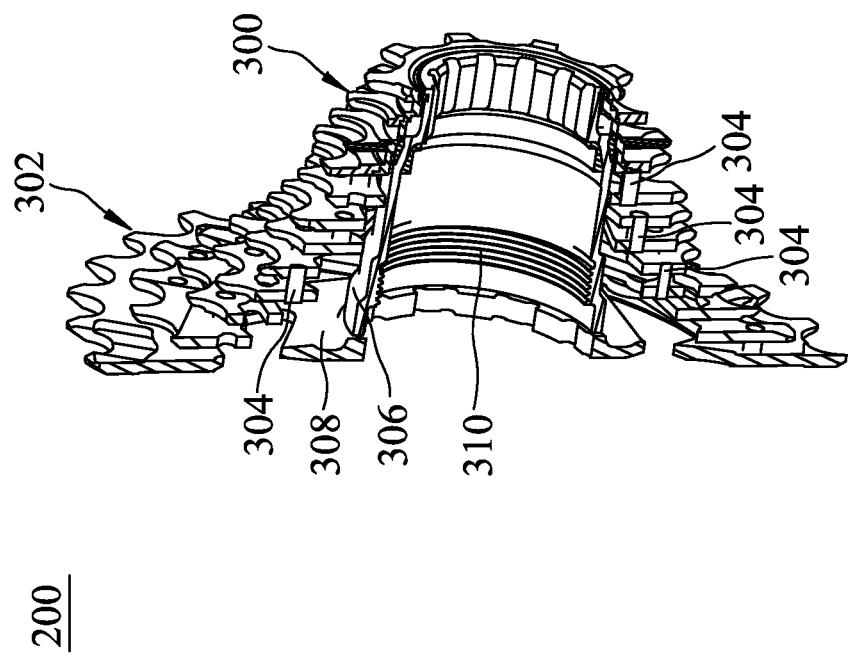
FIG. 3 is a cutaway perspective view of the example multi-sprocket cogset in FIG. 2.

FIG. 2 is a perspective view of an example multi-sprocket cogset 200 that is adapted to be mounted to a bicycle wheel hub assembly and that may serve as the rear sprocket assembly 120 in FIG. 1. FIG. 3 is a cutaway perspective view of the example multi-sprocket cogset. In the illustrated example, the cogset 200 includes a first sprocket assembly 300 that has a plurality of interconnected sprockets, a second sprocket assembly 302 that has a plurality of sprockets interconnected by a plurality of pins 304, and a spacing sleeve 306 that is connected between the first sprocket assembly 300 and the second sprocket assembly 302. In one example, a largest sprocket 308 of the second sprocket assembly 302 may have an inner spline. In one example, the spacing sleeve 306 may have an inner threaded section 310 at a middle section thereof, and an inner spline at an end thereof distal from the largest sprocket 308 of the second sprocket assembly 302. The spacing sleeve 306 may be screwed to a wheel hub sleeve (not shown) by means of the threaded section 310 thereof. The inner spline of the spacing sleeve 306 may be used for guiding an axle or a hub section when the cogset 200 is mounted to a wheel hub assembly (not shown).

Figure 4:
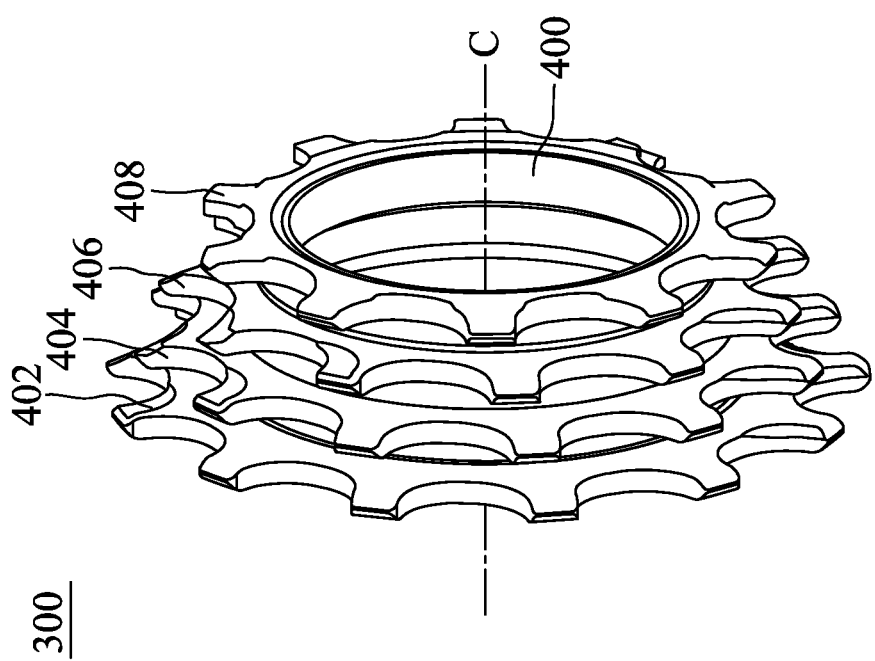
FIG. 4 is a perspective view of an example sprocket assembly according to the disclosure.

FIG. 4 is a perspective view of the example sprocket assembly 300 shown in FIGS. 2 and 3. In the illustrated example, the sprocket assembly 300 includes a carrier 400 that has a central axis (C), and a plurality of sprockets that are disposed on an outer periphery of the carrier 400 and that are disposed along the central axis (C). Each of the sprockets of the example sprocket assembly 300 has a different number of teeth. For example, the plurality of sprockets includes a first sprocket 402 that is mounted to the carrier 400, a second sprocket 404 that is disposed adjacent to the first sprocket 402 and that has a number of teeth smaller than that of the first sprocket 402, a third sprocket 406 that is disposed at one side of the second sprocket 404 opposite to the first sprocket 402 and that has a number of teeth smaller than that of the second sprocket 404, and fourth sprocket 408 that is disposed at one side of the third sprocket 406 opposite to the second sprocket 404 and that has a number of teeth smaller than that of the third sprocket 406.

Figure 5:
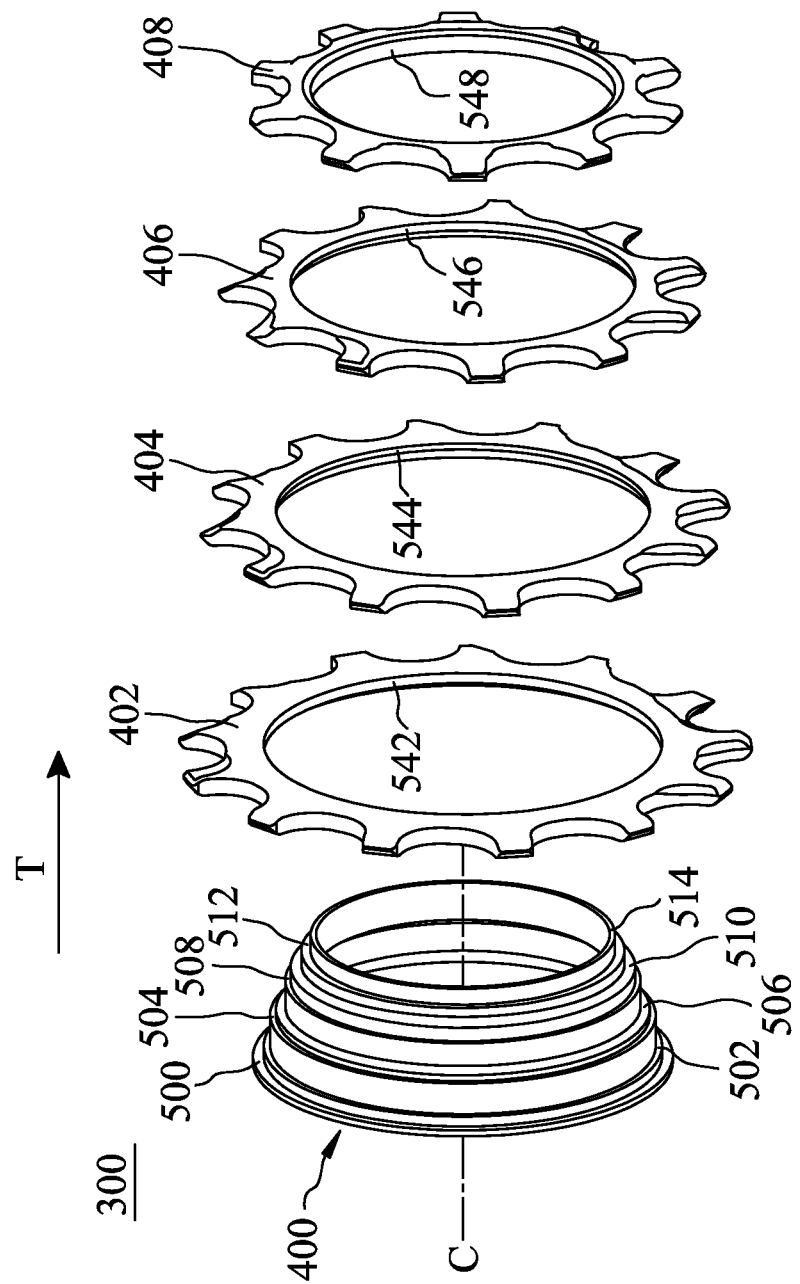
FIG. 5 is an exploded perspective view of the example sprocket assembly in FIG. 4.

FIG. 5 is an exploded perspective view of the example sprocket assembly 300. In the illustrated example, the carrier 400 is in a shape of a stepped cone that substantially tapers in a tapering direction (T) parallel to the central axis (C), and has a plurality of shoulder surfaces 500, 502, 504, 506, 508, 510, 512 that are spaced apart from each other along the central axis (C) and that face in the tapering direction (T), and an end surface 514 that faces in the tapering direction (T). The first sprocket 402 is formed with a central through hole 542 into which the carrier 400 extends. The second sprocket 404 is formed with a central through hole 544 into which the carrier 400 extends. The third sprocket 406 is formed with a central through hole 546 into which the carrier 400 extends. The fourth sprocket 408 is formed with a center through hole 548 into which the carrier 400 extends. In one example, at least one of the sprockets 402, 404, 406, 408 is coupled to the carrier 400 by a weld that is formed via a solid-state welding technique. In another example, the sprockets 402, 404, 406, 408 are coupled to the carrier 400 respectively by a plurality of welds that are formed via a solid-state welding technique. The solid-state welding technique may be, for example, a friction stir welding technique. In one example, the carrier 400 and the sprockets 402, 404, 406, 408 are constructed of a same material, such as aluminum, iron, copper, steel or stainless steel. In one example, each of the sprockets 402, 404, 406, 408 may be constructed of a material different from that of the carrier 400. For example, the carrier 400 may be constructed of aluminum, and each of the sprockets 402, 404, 406, 408 may be constructed of steel. In other examples, the carrier 400 may be constructed of one of aluminum, iron, copper, steel and stainless steel, and each of the sprockets 402, 404, 406, 408 may be constructed of another one of aluminum, iron, copper, steel and stainless steel. The sprockets 402, 404, 406, 408 may be constructed of a same material, or may be constructed of different materials.

Figure 6:
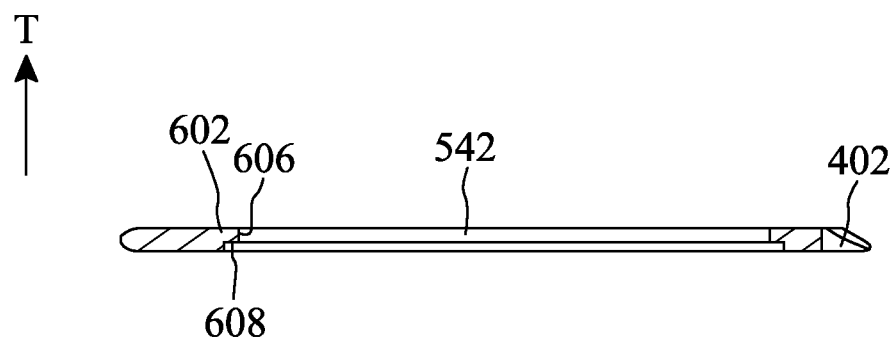
FIG. 6 is a schematic view illustrating an example first sprocket being mounted onto an example carrier.
Figure 6:
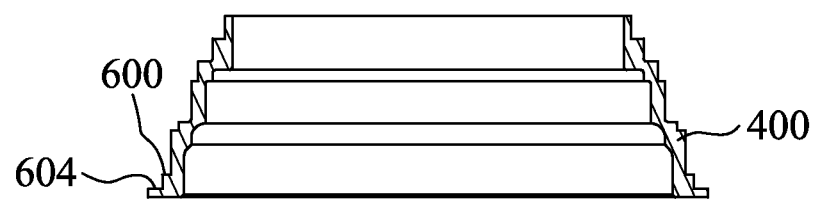
Figure 6:
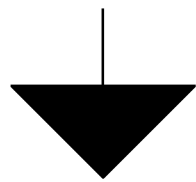
Figure 6:
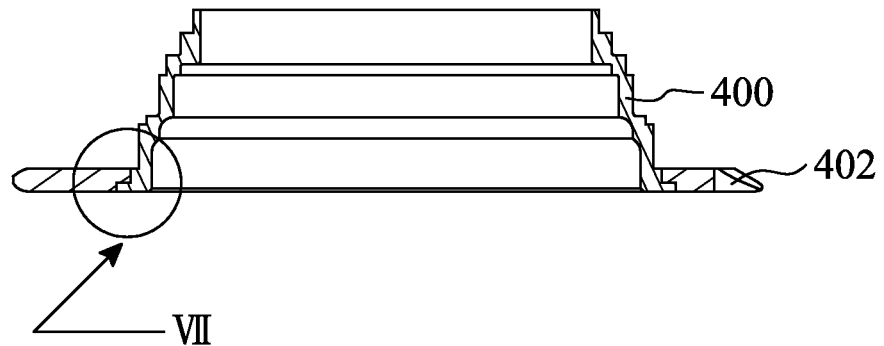

Referring to FIG. 6, in assembling the example sprocket assembly, the first sprocket 402 is moved relative to the carrier 400 in a direction opposite to the tapering direction (T) to be mounted onto the carrier 400. In one example, the carrier 400 has a first carrier working surface 600, and the first sprocket 402 has a first sprocket working surface 602. The first carrier working surface 600 and the first sprocket working surface 602 are flush with each other after the first sprocket 402 is mounted onto the carrier 400, and cooperatively form an annular borderline at a junction therebetween. In one example, the carrier 400 and the central through hole 542 of the first sprocket 402 may be dimensioned to form a transition fit or slip fit. In one example, the carrier 400 and the central through hole 542 of the first sprocket 402 may be dimensioned to form a clearance fit. In one example, the carrier 400 has a first carrier positioning structure 604, and the first sprocket 402 has a first sprocket positioning structure 608 that engages the first carrier positioning structure 604 for enabling the first carrier working surface 600 and the first sprocket working surface 602 to be flush with each other after the first sprocket 402 is mounted onto the carrier 400. In one example, the first sprocket 402 has an first inner surrounding surface 606 that defines the central through hole 542 and that has a stepped structure (e.g., a shoulder surface that faces away from the tapering direction (T)) that serves as the first sprocket positioning structure 608. Referring back to FIG. 5, in one example, one of the shoulder surfaces 502 of the carrier 400 serves as the first carrier working surface 600, another one of the shoulder surfaces 500 serves as the first carrier positioning structure 604.

Figure 7:
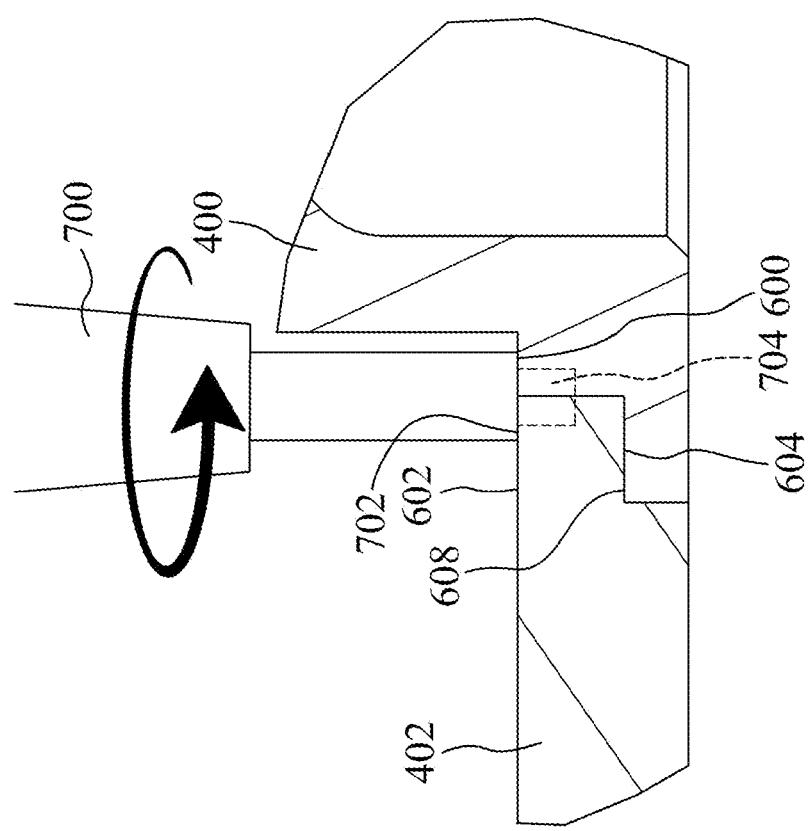
FIG. 7 is an enlarged view of the circled region VII in FIG. 6, illustrating a welding tool being operated to couple the example first sprocket and the example carrier.

Referring to FIG. 7, an example friction stir welding tool 700 is operable to form a weld between the first sprocket 402 and the carrier 400 so as to couple the first sprocket 402 and the carrier 400 together. The friction stir welding tool 700 has a shoulder surface 702, and a bit or probe 704 that protrudes from the shoulder surface 702. The friction stir welding tool 700 may be a part of an automated machine or a handheld tool. After the first sprocket positioning structure 608 engages the first carrier positioning structure 604 and after the friction stir welding tool 700 is rotated up to a relatively high speed as indicated by the arrow in FIG. 7, the probe 704 pierces into the borderline between the first carrier working surface 600 and the first sprocket working surface 602, and the shoulder surface 702 engages and applies pressure on the first carrier working surface 600 and the first sprocket working surface 602. In some examples, a pilot hole may be pre-drilled into the junction between the first carrier working surface 600 and the first sprocket working surface 602 to help ensure the probe 704 is centered. The high speed rotation of the probe 704 generates high temperatures (but still below the melting point(s) of the material(s) of the first sprocket 402 and the carrier 400). This high speed rotation and high temperatures fuses and mixes the material of the first sprocket 402 and the carrier 400 at the junction. The friction stir welding tool 700 is moved along the borderline between the first carrier working surface 600 and the first sprocket working surface 602, and then is removed from the junction. This process forms a weld at the junction that couples the first sprocket 402 and the carrier 400. Various parameters of the friction stir welding tool 700 may be changed to affect (e.g., optimize) the weld, such as the profile of the probe 704, the material of the probe 704, the length and/or width of the probe 704, the speed of rotation of the friction stir welding tool 700, the speed at which the friction stir welding tool 700 moves along the borderline, and/or the pressure applied by the shoulder surface 702.

Figure 8:
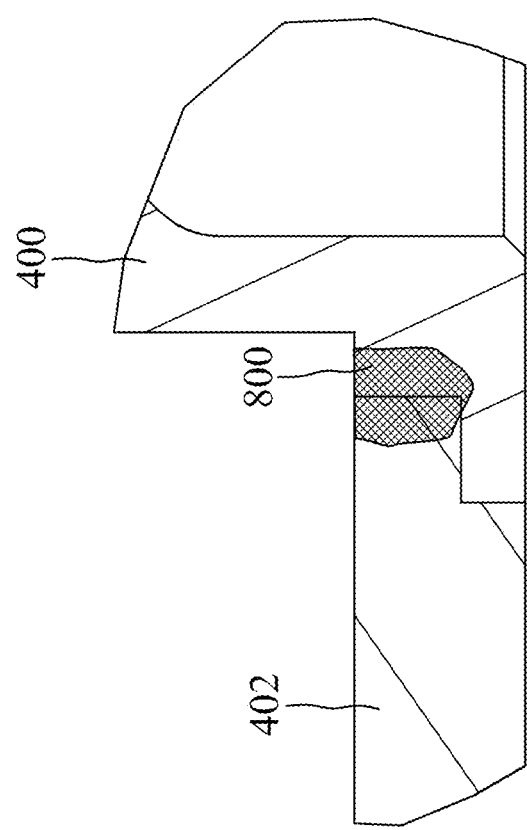
FIG. 8 is a fragmentary sectional view illustrating a weld formed between the example first sprocket and the example carrier.

Referring to FIG. 8, a weld 800 is formed along the borderline between the first carrier working surface 600 and the first sprocket working surface 602 so that the first sprocket 402 and the carrier 400 are firmly coupled together. In one example, the weld 800 is composed only of material of the carrier 400 and material of the first sprocket 402. In some examples, one or more machining operations (e.g., grinding) can be performed to smoothen the weld 800. In one example, the weld 800 may extend over the whole borderline between the first carrier working surface 600 and the first sprocket working surface 602. In one example, the friction stir welding tool 700 may be operated to form a plurality welds that are arranged along the borderline between the first carrier working surface 600 and the first sprocket working surface 602, and that are spaced apart from each other. Friction stir welding enables the first sprocket 402 and the carrier 400 to be welded together while they are constructed of different materials. When the first sprocket 402 and the carrier 400 are constructed of the same material, the weld 800 is constructed of the materials from the first sprocket 402 and the carrier 400. When the first sprocket 402 and the carrier 400 are respectively constructed of two different materials, one of the material with a lower melting point is softened while a surface of another one of the materials with a higher melting point is roughened by the probe 704, so that the two materials are permitted to be firmly bonded together.

In some examples, after the probe 704 is inserted into the borderline between the first carrier working surface 600 and the first sprocket working surface 602, the probe 704 needs a period of time to warm up and to start to soften the material(s) so as to enable the probe 704 to be moved. Further, in some examples, a small hole may be left after the probe 704 is removed at the end of the process. Some additional structure or component may be used to aid the starting and/or ending of the friction stir welding process.

Figure 9:
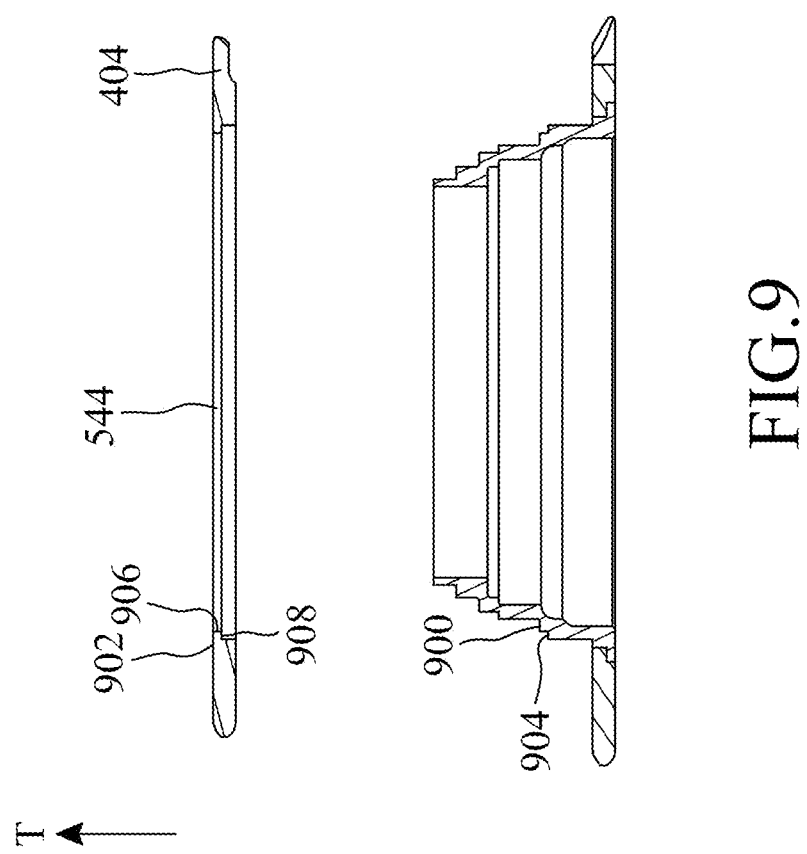
FIG. 9 is a schematic view illustrating an example second sprocket to be mounted onto the example carrier.

Referring to FIG. 9, in one example, after the first sprocket 402 and the carrier 400 are firmly coupled together, the second sprocket 404 may be coupled to the carrier 400 in a manner similar to that of the first sprocket 402. For example, the carrier 400 has a second carrier working surface 900, and the second sprocket 404 has a second sprocket working surface 902. The second carrier working surface 900 and the second sprocket working surface 902 are flush with each other after the second sprocket 404 is mounted onto the carrier 400, and cooperatively form an annular borderline at a junction therebetween. In one example, the carrier 400 and the central through hole 544 of the second sprocket 404 may be dimensioned to form a transition fit or slip fit. In one example, the carrier 400 and the central through hole 544 of the second sprocket 404 may be dimensioned to form a clearance fit. In one example, the carrier 400 has a second carrier positioning structure 904, and the second sprocket 404 has a second sprocket positioning structure 908 that engages the second carrier positioning structure 904 for enabling the second carrier working surface 900 and the second sprocket working surface 902 to be flush with each other after the second sprocket 404 is mounted onto the carrier 400. In one example, the second sprocket 404 has an second inner surrounding surface 906 that defines the central through hole 544 and that has a stepped structure (e.g., a shoulder surface that faces away from the tapering direction (T)) that serves as the second sprocket positioning structure 908. Referring back to FIG. 5, in one example, one of the shoulder surfaces 506 of the carrier 400 serves as the second carrier working surface 900, another one of the shoulder surfaces 504 serves as the second carrier positioning structure 904. Similarly, the friction stir welding tool 700 shown in FIG. 7 is operable to form a weld between the second sprocket 404 and the carrier 400 so as to couple the second sprocket 404 and the carrier 400 together.

Figure 10:
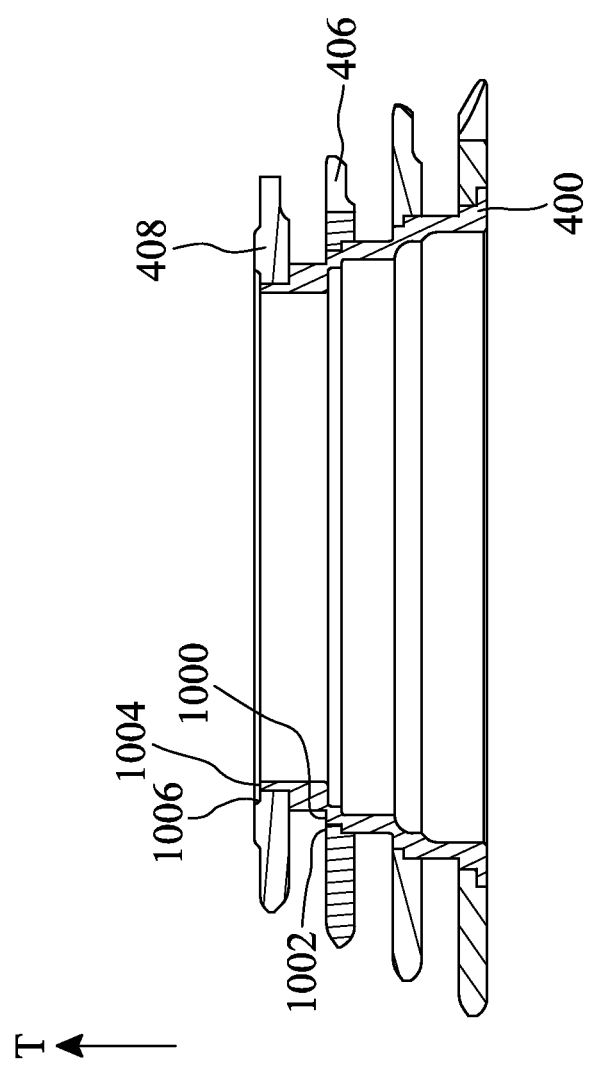
FIG. 10 is a sectional view of the example sprocket assembly in FIG. 4.

Referring to FIG. 10, in one example, after the second sprocket 404 is firmly coupled to the carrier 400, the third sprocket 406 may be coupled to the carrier 400 in a manner similar to that of the first sprocket 402. For example, the carrier 400 has a third carrier working surface 1000, and the third sprocket 406 has a third sprocket working surface 1002. The third carrier working surface 1000 and the third sprocket working surface 1002 are flush with each other after the third sprocket 406 is mounted onto the carrier 400, and cooperatively form an annular borderline at a junction therebetween. In one example, the carrier 400 and the central through hole 546 of the third sprocket 406 may be dimensioned to form a transition fit or slip fit. In one example, the carrier 400 and the central through hole 546 of the third sprocket 406 may be dimensioned to form a clearance fit. Referring back to FIG. 5, in one example, one of the shoulder surfaces 510 of the carrier 400 serves as the third carrier working surface 1000. The friction stir welding tool 700 shown in FIG. 7 is operable to form a weld between the third sprocket 406 and the carrier 400 so as to couple the third sprocket 406 and the carrier 400 together.

In one example, after the third sprocket 406 is firmly coupled to the carrier 400, the fourth sprocket 408 may be coupled to the carrier 400 in a manner similar to that of the first sprocket 402. For example, the carrier 400 has a fourth carrier working surface 1004, and the fourth sprocket 408 has a fourth sprocket working surface 1006. The fourth carrier working surface 1004 and the fourth sprocket working surface 1006 are flush with each other after the fourth sprocket 408 is mounted onto the carrier 400, and cooperatively form an annular borderline at a junction therebetween. In one example, the carrier 400 and the central through hole 548 of the fourth sprocket 408 may be dimensioned to form a transition fit or slip fit. In one example, the carrier 400 and the central through hole 548 of the fourth sprocket 408 may be dimensioned to form a clearance fit. Referring back to FIG. 5, in one example, the end surface 514 of the carrier 400 that faces in the tapering direction (T) serves as the fourth carrier working surface 1004. The friction stir welding tool 700 shown in FIG. 7 is operable to form a weld between the fourth sprocket 408 and the carrier 400 so as to couple the fourth sprocket 408 and the carrier 400 together.

Figure 11:
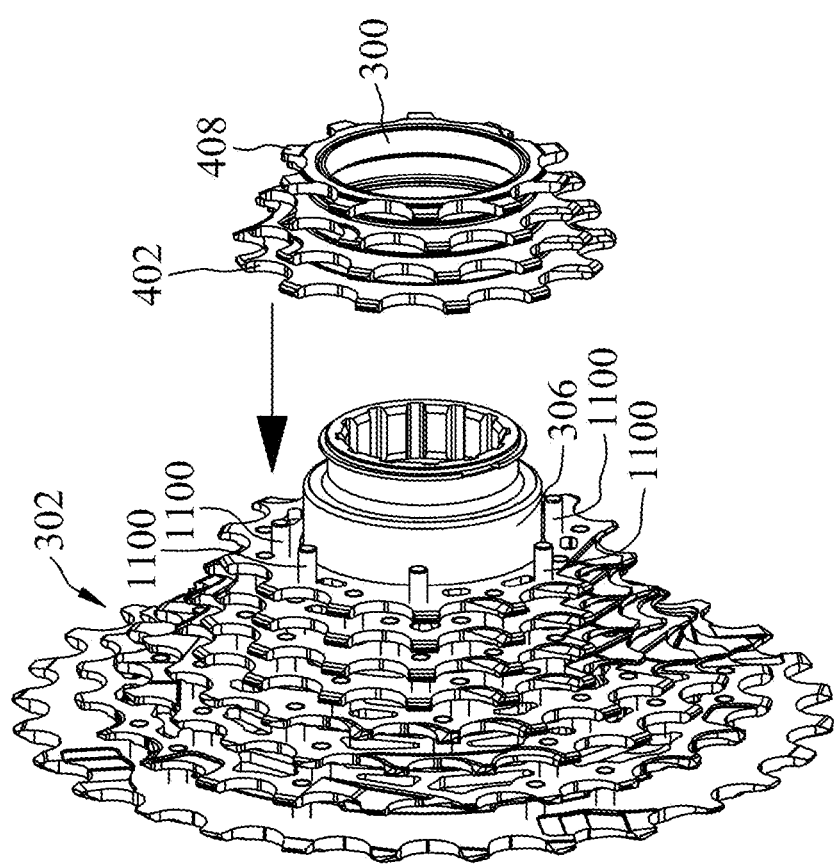
FIG. 11 is a schematic view illustrating the example sprocket assembly in FIG. 4 to be coupled to another sprocket assembly.

FIG. 11 is a schematic perspective view showing the example first sprocket assembly 300 being attached to the example second sprocket assembly 302. For example, the example second sprocket assembly 302 includes a plurality of connecting pins 1100 protruding from a smallest one of the sprockets thereof. An end surface of the first sprocket 402 of the example first sprocket assembly 300 opposite to the fourth sprocket 408 may be formed with a plurality of connecting holes (not shown) that respectively correspond in position to the connecting pins 1100 of the second sprocket assembly 302. The first sprocket assembly 300 is moved toward the second sprocket assembly 302 such that the connecting pins 1100 are respectively inserted into the connecting holes of the first sprocket assembly 300, and that the first sprocket assembly 300 and the second sprocket assembly 302 are coupled together to form an example multi-sprocket cogset.

In summary, by virtue of the solid-state welding technique, a plurality of sprockets may be assembled together within a relatively short period of time and with a relative low cost. In addition, material(s) of the carrier and the sprockets may be elaborately selected such that various properties of the sprocket assembly, such as weight, structural strength, thermal conductivity . . . etc may be optimized.

Figure 12:
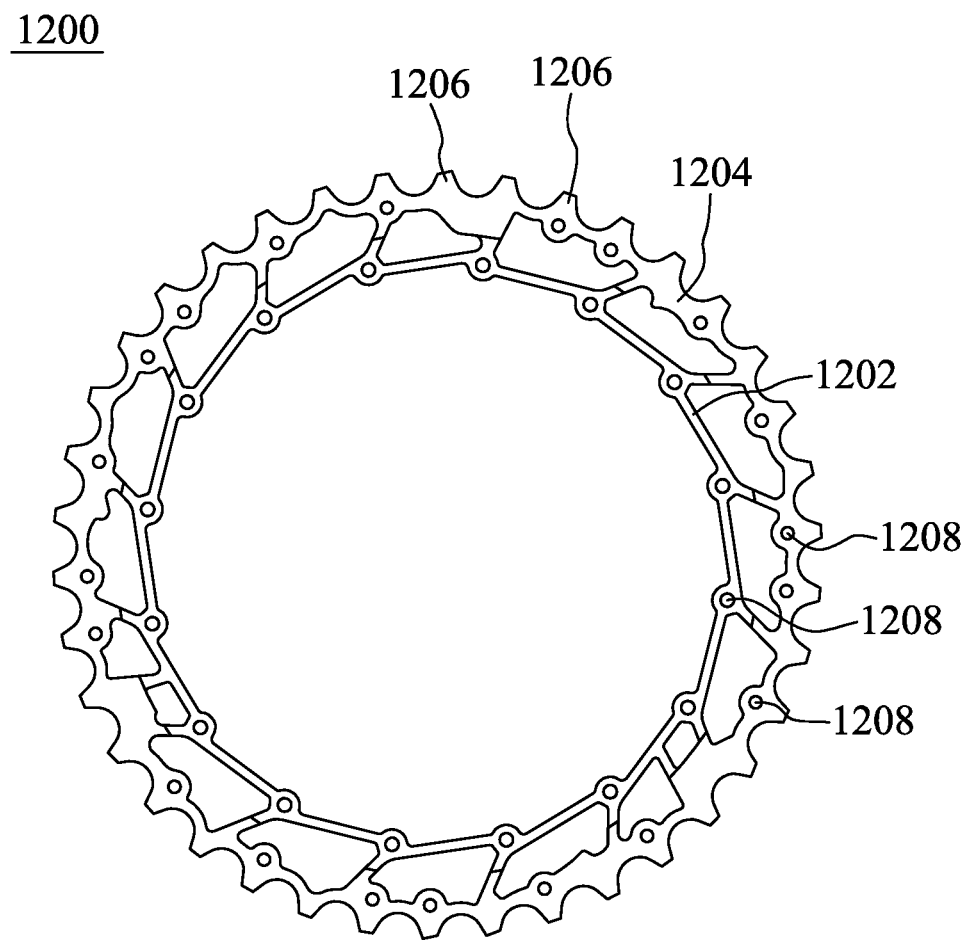
FIG. 12 is a side view of another example sprocket assembly according to the disclosure.

FIG. 12 shows another example sprocket assembly. For example, the illustrated sprocket assembly 1200 includes a carrier 1202, and a sprocket 1204 that is coupled to the carrier 1202 via a solid-state welding technique. The example sprocket 1204 has a plurality of teeth 1206 at an outer periphery thereof. The example sprocket assembly 1200 may includes a plurality of attachment structures 1208 formed on the carrier 1202 and/or the sprocket 1204, so that the example sprocket assembly 1200 may be coupled to another sprocket(s) or a hub component by virtue of the attachment structures 1208 so as to form a multi-sprocket assembly that may serve as the front sprocket assembly 118 or the rear sprocket assembly 120 shown in FIG. 1. The solid-state welding technique may be, for example, a friction stir welding technique. In one example, the carrier 1202 and the sprocket 1204 are constructed of a same material, such as aluminum, iron, copper, steel or stainless steel. In one example, the sprocket 1204 may be constructed of a material different from that of the carrier 1202. For example, the carrier 1202 may be constructed of aluminum, and the sprocket 1204 may be constructed of steel. An aluminum carrier has relatively light weight, and can be finished by various surface treatments easily, such as anodizing, polishing, plating, painting . . . etc. In other examples, the carrier 1202 may be constructed of one of aluminum, iron, copper, steel and stainless steel, and the sprocket 1204 may be constructed of another one of aluminum, iron, copper, steel and stainless steel.

Figure 13:
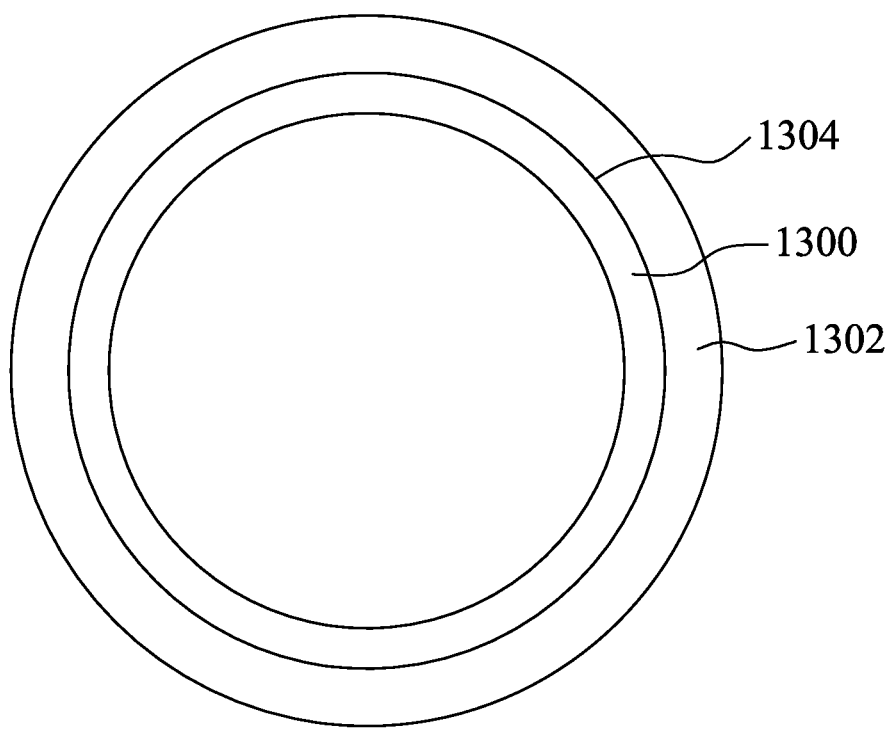
FIG. 13 is a schematic view illustrating formation of the example sprocket assembly in FIG. 12.

Referring to FIG. 13, in formation of the example sprocket assembly shown in FIG. 12, an inner ring 1300 is inserted into a central through hole of an outer ring 1302 to form an annular borderline 1304 at a junction therebetween. In one example, the inner ring 1300 and the outer ring 1302 may be dimensioned to form a transition fit or slip fit. In one example, the inner ring 1300 and the outer ring 1302 may be dimensioned to form a clearance fit. The example friction stir welding tool 700 shown in FIG. 7 is operable to pierce into the inner ring 1300 and the outer ring 1302, and to move along the borderline 1304 so as to form a weld (not shown) between the inner ring 1300 and the outer ring 1302 so that the inner ring 1300 and the outer ring 1302 are firmly coupled together. In one example, the weld may extend over the whole borderline between the inner ring 1300 and the outer ring 1302. In one example, the example friction stir welding tool 700 may be operated to form a plurality welds that are arranged along the borderline between the inner ring 1300 and the outer ring 1302, and that are spaced apart from each other. After the inner ring 1300 and the outer ring 1302 are firmly coupled together, the teeth 1206 and/or the attachment structures 1208 (see FIG. 12) may be formed, for example, via a stamping process. In other examples, the teeth 1206 and/or the attachment structures 1208 may be formed via CNC machining or other machining processes. After the abovementioned processes, the inner ring 1300 serves as the example carrier 1202 in FIG. 12, and the outer ring 1302 serves as the example sprocket 1204 in FIG. 12.

In manufacturing the example sprocket assembly 1200 in FIG. 12, the materials of the carrier 1202 and the sprocket 1204 may be elaborately selected such that the carrier 1202 has a relatively light weight while the sprocket 1204 has sufficient strength. In some example, the materials of the carrier 1202 and the sprocket 1204 with different thermal conductivities may be elaborately selected such that the sprocket assembly 1200 may have better thermal radiation property.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A sprocket assembly adapted for a bicycle, comprising:
a carrier having a central axis; and
a plurality of sprockets each having a different number of teeth and formed with a central through hole, the carrier extending into the central through hole of each of the sprockets such that the sprockets are disposed on an outer periphery of the carrier and are disposed along the central axis, at least one of the sprockets being coupled to the carrier by a weld that is formed via a solid-state welding technique,
wherein the carrier has at least one carrier working surface, the at least one of the sprockets having a sprocket working surface that is flush with the at least one carrier working surface across a junction between the at least one carrier working surface and the sprocket working surface of the at least one of the sprockets, the weld being formed at the junction.

2. The sprocket assembly as claimed in claim 1, wherein the carrier has at least one carrier positioning structure, the at least one of the sprockets having a sprocket positioning structure that engages the at least one carrier positioning structure.

3. The sprocket assembly as claimed in claim 2, wherein the carrier is in a shape of a stepped cone, and has a plurality of shoulder surfaces that are spaced apart from each other along the central axis, one of the shoulder surfaces serving as the at least one carrier working surface, another one of the shoulder surfaces serving as the at least one carrier positioning structure.

4. The sprocket assembly as claimed in claim 2, wherein the outer periphery of the carrier has a stepped structure that serves as the at least one carrier positioning structure, an inner surrounding surface of the at least one of the sprockets defining the central through hole of the at least one of the sprockets, and having a stepped structure that serves as the sprocket positioning structure.

5. The sprocket assembly as claimed in claim 1, wherein the weld extends over the whole junction between the at least one carrier working surface and the sprocket working surface of the at least one of the sprockets.

6. The sprocket assembly as claimed in claim 1, wherein the carrier and the central through hole of the at least one of the sprockets are dimensioned to form a transition fit.

7. The sprocket assembly as claimed in claim 1, wherein the weld is composed only of material of the carrier and material of the at least one of the sprockets.

8. The sprocket assembly as claimed in claim 1, wherein the carrier and the at least one of the sprockets are constructed of a same material.

9. The sprocket assembly as claimed in claim 1, wherein the carrier and the at least one of the sprockets are constructed of different materials.

10. The sprocket assembly as claimed in claim 9, wherein the carrier is constructed of aluminum, the at least one of the sprockets being constructed of steel.

11. The sprocket assembly as claimed in claim 9, wherein the carrier is constructed of one of aluminum, iron, copper, steel and stainless steel, the at least one of the sprockets being constructed of another one of aluminum, iron, copper, steel and stainless steel.

12. The sprocket assembly as claimed in claim 1, wherein the sprockets are coupled to the carrier respectively by a plurality of welds that are formed via a solid-state welding technique.

13. A sprocket assembly adapted for a bicycle, comprising:
- a carrier; and
- at least one sprocket formed with a central through hole, the carrier extending into the central through hole of the at least one sprocket such that the at least one sprocket is disposed on an outer periphery of the carrier, the at least one sprocket being coupled to the carrier by a weld that is formed via a solid-state welding technique, wherein the carrier has at least one carrier working surface, the at least one of the sprockets having a sprocket working surface that is flush with the at least one carrier working surface across a junction between the at least one carrier working surface and the sprocket working surface of the at least one of the sprockets, the weld being formed at the junction.

14. The sprocket assembly as claimed in claim 13, wherein the carrier has a carrier positioning structure, the at least one sprocket having a sprocket positioning structure that engages the carrier positioning structure.

15. The sprocket assembly as claimed in claim 14, wherein the outer periphery of the carrier has a stepped structure that serves as the carrier positioning structure, an inner surrounding surface of the at least one sprocket defining the central through hole of the at least one sprocket, and having a stepped structure that serves as the sprocket positioning structure.

16. The sprocket assembly as claimed in claim 13, wherein the weld extends over the whole junction between the carrier working surface and the sprocket working surface of the at least one sprocket.

17. The sprocket assembly as claimed in claim 13, wherein the carrier and the central through hole of the at least one sprocket are dimensioned to form a transition fit.

18. The sprocket assembly as claimed in claim 13, wherein the weld is composed only of material of the carrier and material of the at least one sprocket.

19. The sprocket assembly as claimed in claim 13, wherein the carrier and the at least one sprocket are constructed of a same material.

20. The sprocket assembly as claimed in claim 13, wherein the carrier and the at least one sprocket are constructed of different materials.

21. The sprocket assembly as claimed in claim 20, wherein the carrier is constructed of aluminum, the at least one sprocket being constructed of steel.

22. The sprocket assembly as claimed in claim 20, wherein the carrier is constructed of one of aluminum, iron, copper, steel and stainless steel, the at least one sprocket being constructed of another one of aluminum, iron, copper, steel and stainless steel.

23. The sprocket assembly as claimed in claim 13, wherein the at least one sprocket has a plurality of teeth, the teeth of the at least one sprocket being formed via a stamping process.

24. The sprocket assembly as claimed in claim 13, wherein the at least one sprocket has a plurality of teeth, the teeth of the at least one sprocket being formed after the weld is formed between the at least one sprocket and the carrier.

* * * * *